(12) United States Patent
Prucher

(10) Patent No.: US 11,870,322 B2
(45) Date of Patent: Jan. 9, 2024

(54) SYNCHRONIZED DUAL RADIAL GAP MOTOR CLUSTER ASSEMBLY

(71) Applicant: Bryan Prucher, Clarkston, MI (US)

(72) Inventor: Bryan Prucher, Clarkston, MI (US)

( * ) Notice: Subject to any disclaimer, the term of this patent is extended or adjusted under 35 U.S.C. 154(b) by 0 days.

(21) Appl. No.: 17/852,732

(22) Filed: Jun. 29, 2022

(65) Prior Publication Data

US 2023/0006505 A1    Jan. 5, 2023

Related U.S. Application Data

(60) Provisional application No. 63/216,782, filed on Jun. 30, 2021.

(51) Int. Cl.
*H02K 7/00* (2006.01)
*H02K 11/21* (2016.01)
*H02K 24/00* (2006.01)
*H02K 21/14* (2006.01)
*H02K 11/40* (2016.01)

(52) U.S. Cl.
CPC ............. *H02K 7/003* (2013.01); *H02K 11/21* (2016.01); *H02K 11/40* (2016.01); *H02K 21/14* (2013.01); *H02K 24/00* (2013.01)

(58) Field of Classification Search
CPC ......... G01L 19/04; G01L 19/147; G01L 9/00; H02K 11/21; H02K 11/40; H02K 16/00; H02K 21/12; H02K 21/14; H02K 21/22; H02K 2203/09; H02K 2213/12; H02K 24/00; H02K 3/50; H02K 5/04; H02K 5/225; H02K 7/003
See application file for complete search history.

(56) References Cited

U.S. PATENT DOCUMENTS

| | | | | |
|---|---|---|---|---|
| 4,409,491 A * | 10/1983 | Schott | ....................... | H02J 3/42 307/77 |
| 5,844,342 A * | 12/1998 | Miyatani | ............... | B60W 20/40 903/905 |
| 9,906,105 B1 * | 2/2018 | Linares | ................... | H02K 7/116 |
| 2002/0047424 A1 * | 4/2002 | Varenne | ............... | H02K 1/2773 310/156.01 |
| 2006/0059955 A1 * | 3/2006 | Kim | ..................... | H02K 21/222 68/3 R |
| 2011/0221296 A1 * | 9/2011 | Vedy | .................... | H02K 1/2773 310/156.14 |
| 2019/0115812 A1 * | 4/2019 | Kinpara | ................. | H02K 11/21 |

* cited by examiner

*Primary Examiner* — Naishadh N Desai

(57) ABSTRACT

A modular motor system and methods wherein at least two dual radial gap motors with attachment points may be joined together in a modular manner for the purpose of providing the capability of incrementally increasing or decreasing the total power output of the modular.

8 Claims, 12 Drawing Sheets

SYNCHRONIZED DUAL RADIAL GAP MOTOR CLUSTER ASSEMBLY

CROSS-REFERENCE TO RELATED APPLICATION

This application is a Completion Application of U.S. Patent Application Ser. No. 63/216,782, filed Jun. 30, 2021, for "Synchronized Dual Radial Gap Motor Cluster Assembly," the disclosure of which is hereby incorporated by reference in its entirety including the drawings.

BACKGROUND

1. Field of the Invention

This invention pertains to a modular approach of clustering a number of dual radial gap electric motor modules in a linear assembly as a method to incrementally increase or decrease the total power output available for performing a particular task. This is accomplished by adding or subtracting the number of motor modules within the cluster.

2. Prior Art

U.S. Pat. No. 9,124,144, issued Sep. 1, 2015, to Bryan Prucher, entitled DUAL RADIAL GAP MOTOR-GENERATOR STRUCTURE ("the '144 Patent"), the entire contents of which are incorporated herein, discloses and teaches a dual radial gap DC motor/generator that is functionally both an inside and outside rotor motor packaged within the same housing. The '144 Patent discloses that the motor generator has a rotor composed of at least two spaced apart annular rings, each having an inner surface and an outer surface, containing an array of permanent magnets with alternating polarities and a common central axis. The annular rings are operationally attached to a central power shaft. A stator composed of a circular array of induction coils is encircled by the annular rings and centrally positioned so that there are equal gaps between the induction coils and the magnets of both rings. The stator is fixed between the annular rings so that the rotor and stator have the same axis of rotation. This arrangement produces a motor/generator with a donut shaped configuration having a hollow, unused central section. When employing more than one dual radial gap motor in a propulsion application each motor requires an individual motor controller and a rotary encoder or resolver for it to function.

For reducing cost and complexity, it would be desirable to provide a system or method whereby more than one motor could be used collectively in tandem to contribute to a single power output. It would be further desirable if these motors were to share the same motor controller and resolver or rotary encoder.

SUMMARY OF THE INVENTION

There is disclosed and taught herein a modular motor system and method, wherein at least two dual radial gap motors with attachment points may be joined together in a modular manner for the purpose of providing the capability of incrementally increasing or decreasing the total power output of the modular motor system while having only one common controller and one common resolver or rotary encoder.

The power output of the modular motor system is incrementally increased or decreased by adding or subtracting a common individual motor module to the system. The modular motor system of the present invention has the advantage of providing power output flexibility and reducing system complexity by and having a standardized dual radial gap motor design capable of being used as a module in a system of more than one motor. Additionally, there is an overall system cost reduction by controlling the entire modular motor system with only one controller and one rotary encoder or resolver.

In a first embodiment, there is disclosed a cluster of at least two dual radial gap motor modules with complementary attachment points, assembled and mechanically connected in-line with one another, in-series, end-to-end, in a linear configuration. The motors within the cluster further include a rotor comprising a power output shaft and a base plate connecting two magnet rotor rings centrally and complementarily oriented around the shaft. The common rotor power output shaft employs a polygon shape to operationally connect and synchronize the magnetic orientation of the rotors of each of the motor modules with one another. Each motor also module includes a stator encompassed by the magnet rings. There is further one resolver used to determine their collective rotational angle and one controller to control its motion.

In a second embodiment, the power rotor shaft may be provided with a multi-lobe polygonal hole extending along its center axis.

According to this embodiment, the rotor output shaft may have a male multi-lobe configuration at one end and a female multi-lobe configuration at the other to allow the motors to couple or attach within one another and to be operationally attached and magnetically synchronized when coupled together.

A polygon shaped rod complementary within a close tolerance to the internal configuration of the polygon shaped hole in the power rotor shaft passes through the central polygon hole in the power rotor shaft connecting each of the motor rotors, radially orientating and rotationally lock them together within each in-series cluster of motors.

The modular motor system herein transmits the torque and provides angular magnetic synchronization and affords a blind engagement between each motor of the modular motor system. The motors of the modular motor system attach to secure the rotor output shaft of each motor in the cluster using a multi-lobe polygon connection.

In both embodiments, the modular motor system may include a module housing mounted opposite a power delivery end of the modular motor system or cluster assembly. The module housing may contain one of a resolver and, optionally, a single motor controller. The resolver may be operationally attached or coupled to the end of the polygon power shaft or rod to sense the angular position of the rotors of all of the motors within the cluster assembly. This approach results in only one resolver and one controller required to facilitate the entire cluster of motors of the modular motor system as opposed to requiring one resolver and one controller for each motor.

In both embodiments, a cluster assembly or modular motor system includes more than one multi-phased motor. Each motor includes an electrical power contact for each of the phases of the motor, as well as optionally, a common ground contact. The individual points of contact may be angularly offset within each motor and protrude externally from the motor housing. The points of contact for all of the motors within the cluster may be axially in-line with one another.

In one embodiment, each phase contact and, optionally the ground contact, for the motors in the cluster assembly may include a bus bar extending in a direction aligned with the axis of the cluster assembly and electronically coupling the phase contacts of all of the motors so that the power output of each motor is produced in parallel. The parallel bus bars will terminate in the module housing containing the resolver with contact points that will be used to connect to the motor controller. This parallel configuration allows for only one controller being required to operate the machine as opposed to requiring one controller for each motor.

The total power output of the modular motor system is the sum of the power delivered from each individual motor or module and may be incrementally increased or decreased by adding or subtracting motors to obtain a desired output level. Optionally, in the event that there is a need to change the RPM output range, a separate gear reduction unit with the desired gear ratio may be operationally attached to the power delivery end of the polygon shaft.

For a more complete understanding of the present disclosure, reference is made to the following detailed description and accompanying drawings. In the drawings, like reference characters refer to like parts throughout the several views in which:

DETAILED DESCRIPTION

Figure 1:
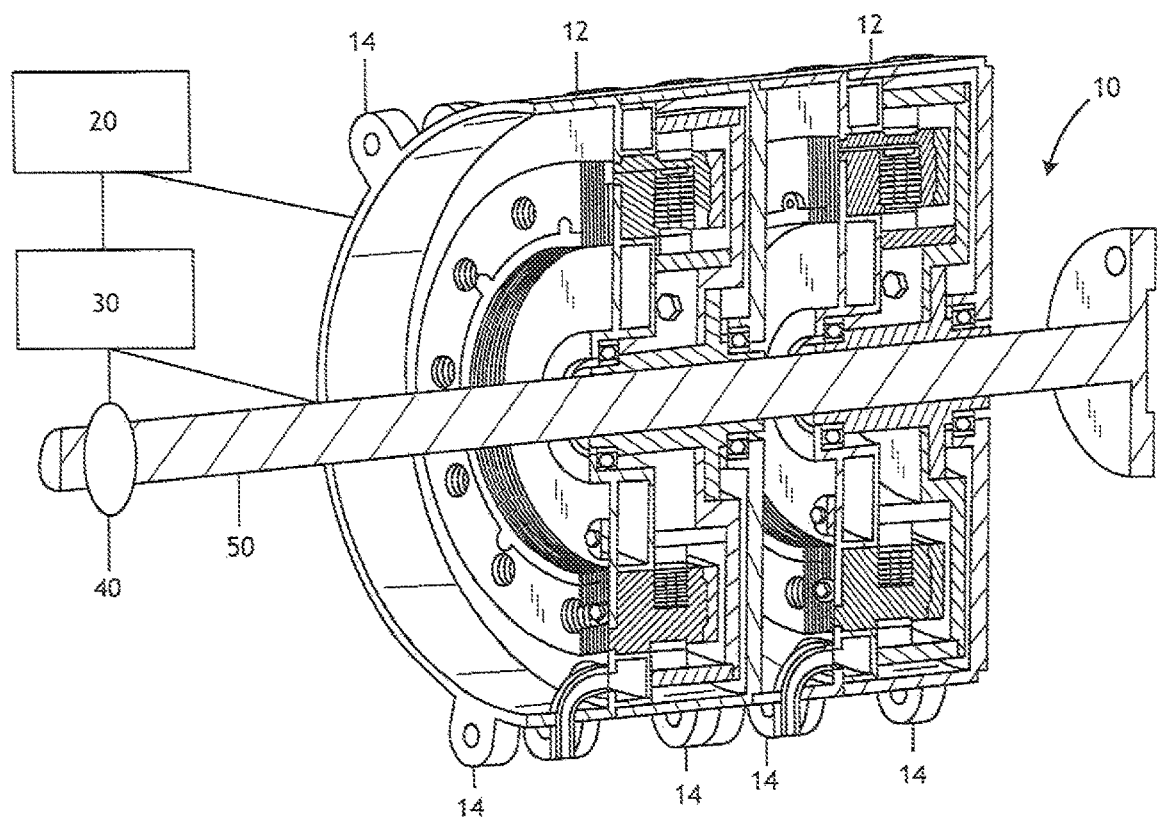
FIG. 1 is a cross-section, perspective view of a first embodiment of a modular dual motor cluster assembly in accordance with the present disclosure.
Figure 2:
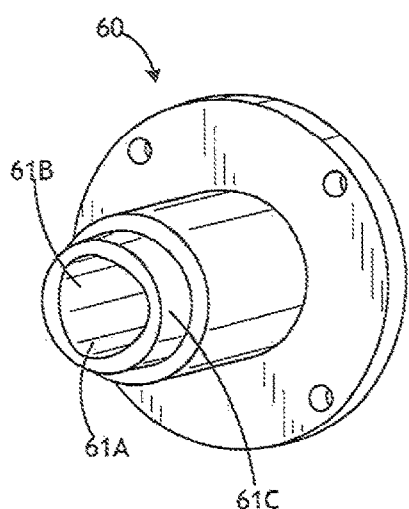
FIG. 2 is a cross-sectional, plan view of the rotating shaft hub of the present disclosure.
Figure 3:
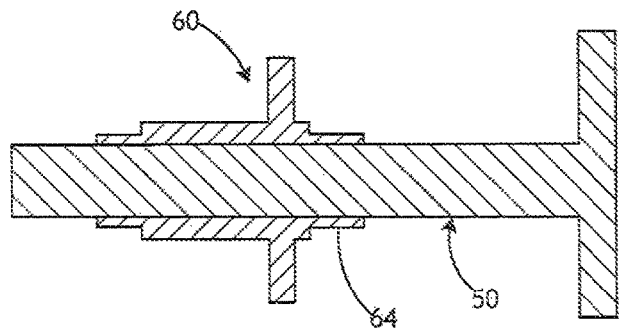
FIG. 3 is a cross-section, plan view of the rotating shaft hub of FIG. 2 on a shaft in accordance with the present disclosure.

As shown in the drawings and in particular FIGS. 1-8 and in a first embodiment, there is a modular motor or cluster motor system 10 including at least two dual radial gap motors 12 with attachment points 14 that may be joined together in a modular manner for the purpose of providing the capability of incrementally increasing or decreasing the total power output of the modular motor system 10 while having only one common controller 20 and one common resolver or rotary encoder 30. An attachment 40 is used to mount the encoder or resolver to an output shaft 50.

The power output of the modular motor system 10 is incrementally increased or decreased by adding or subtracting another motor module 12 to the motor cluster system 10. The modular motor system 10 here has the advantage of providing power output flexibility and reducing system complexity by having a standardized dual radial gap motor 12 design capable of being used as part of the motor modular module cluster system 10. The controller 20 is capable of controlling the entire modular motor system 10 using the rotary encoder or resolver 30.

The attachment points 14 of each motor 12 are configured to be complementary when assembled and mechanically connected in-line with one another, in-series, end-to-end, in a linear configuration as shown in FIG. 1.

Figure 6:
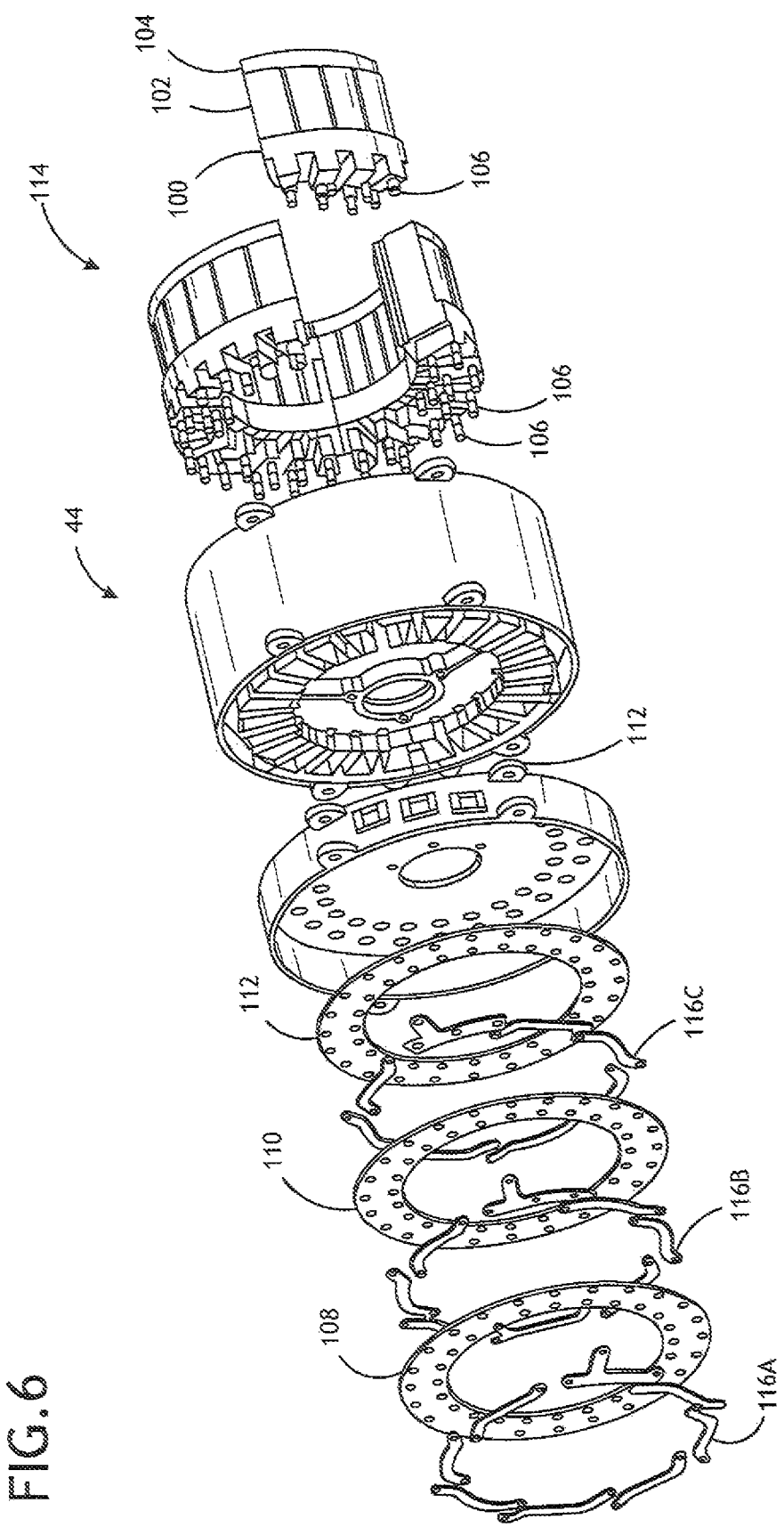
FIG. 6 is an exploded perspective view of the stator used herein.
Figure 14:
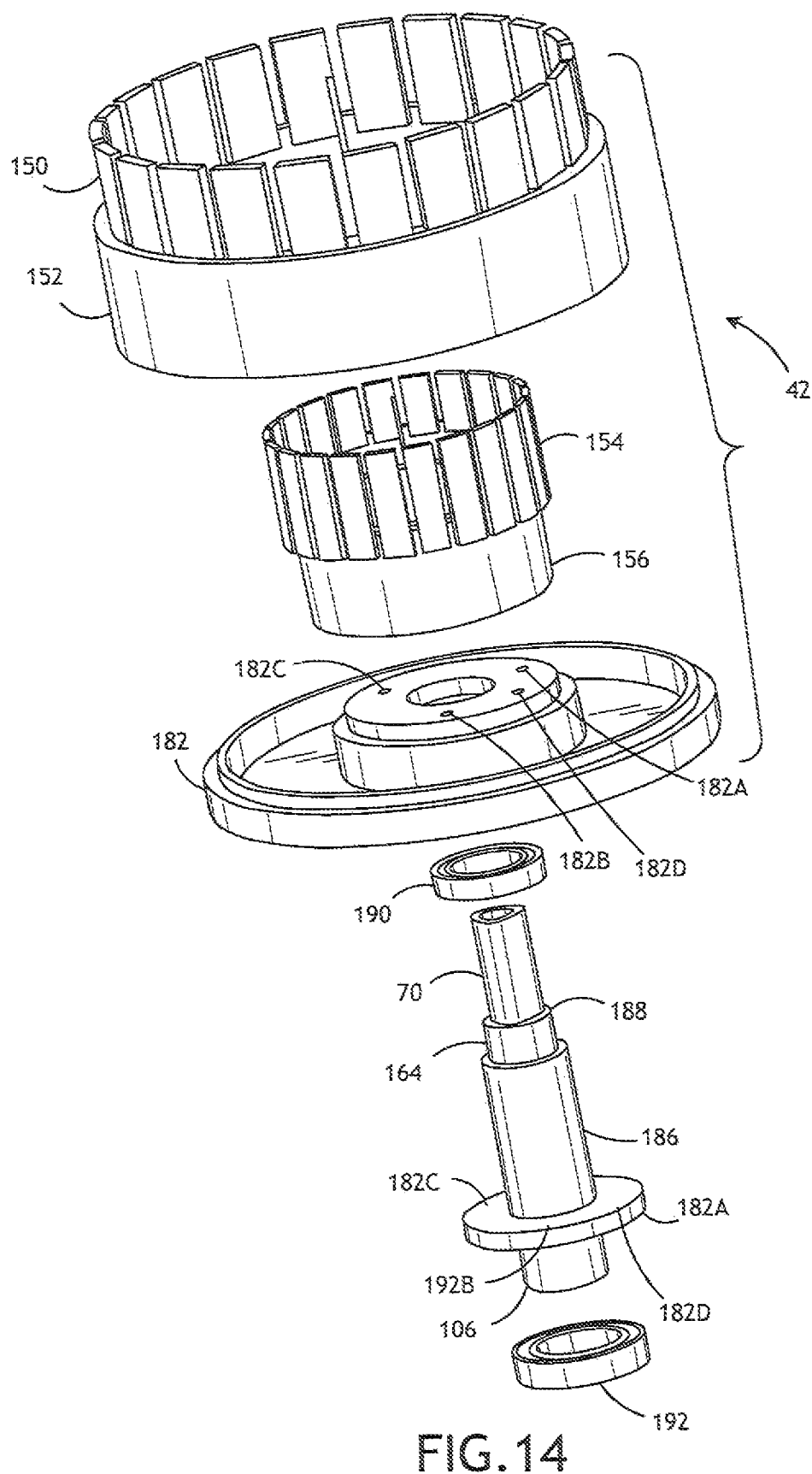
FIG. 14 is a perspective view of a rotor used in the practice of the present invention and in conjunction with the shaft of the second embodiment hereof.

As shown in FIGS. 1, 6 and 14 each motor in the cluster assembly 10 further includes a rotor 42 and a stator 44, having a sharing a common power output shaft 50. Each motor has a rotor which connects to the shaft 50.

Figure 4:
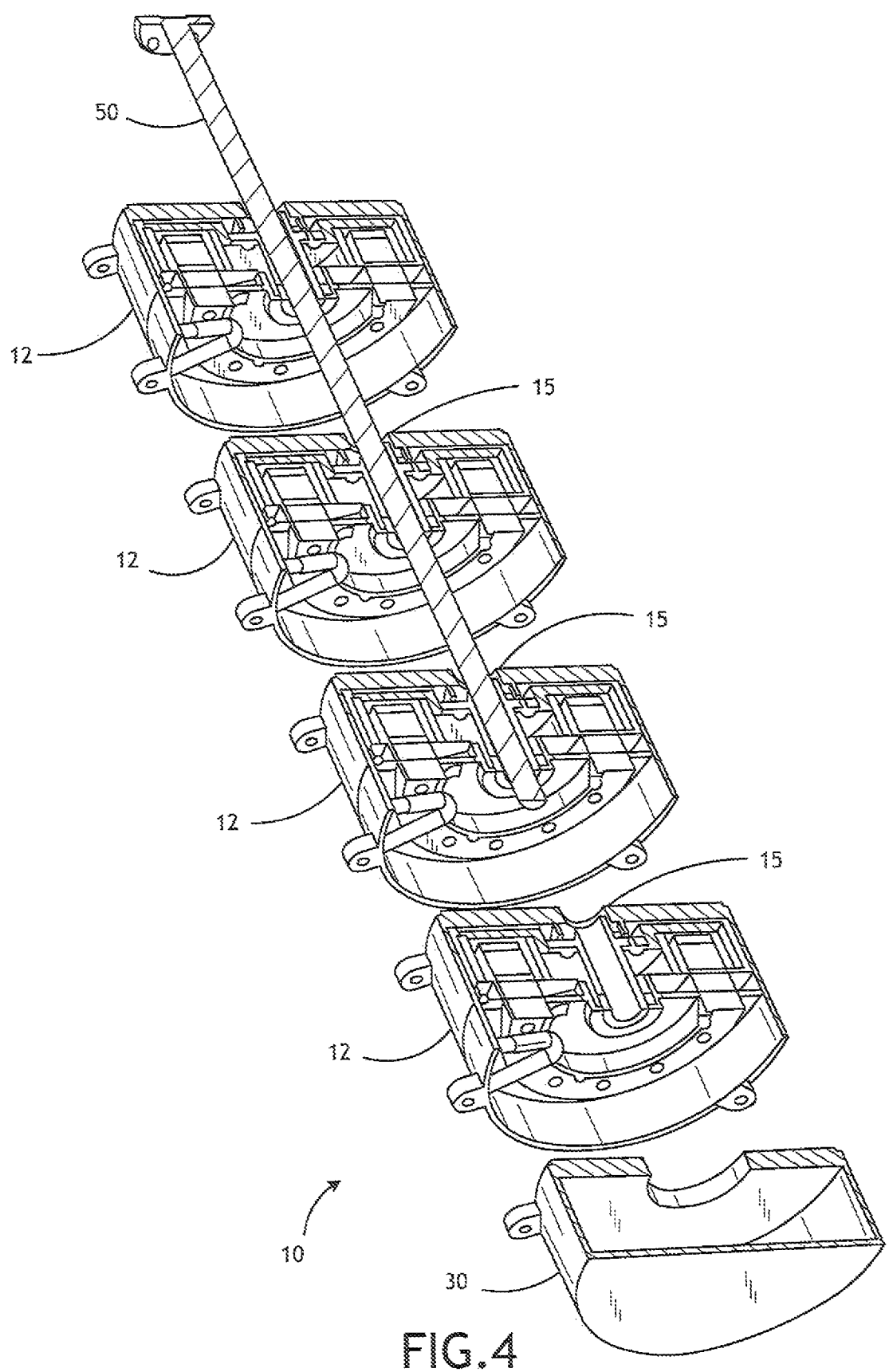
FIG. 4 is an exploded, perspective cross-sectional view of a four motor cluster in accordance with the present invention.
Figure 5:
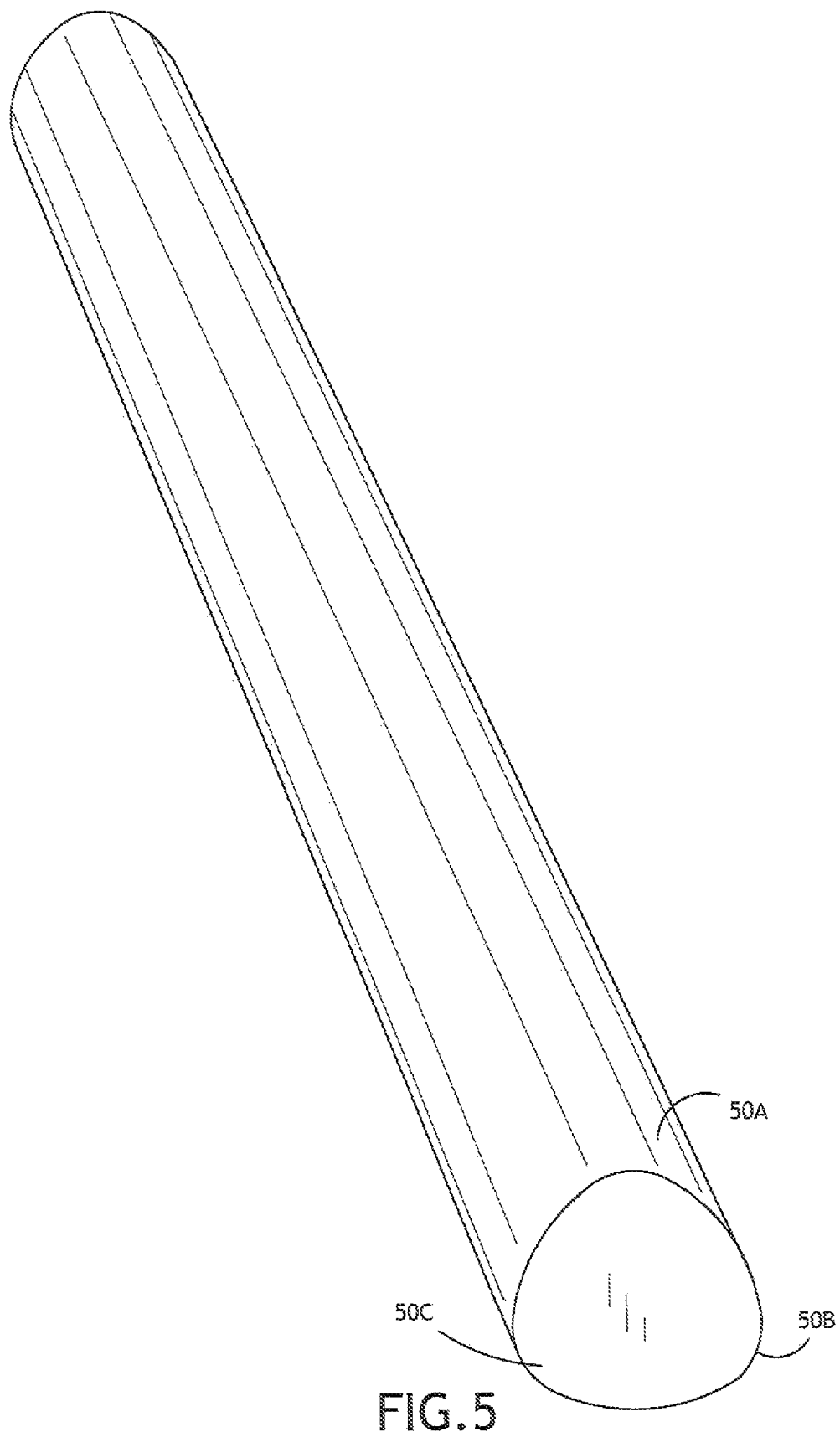
FIG. 5 is a perspective view of the power shaft used herein.

In this embodiment and a shown in FIG. 4, the modular motor system 10 transmits the torque output of each motor 12 and includes angular synchronization of the motors 12 and includes a blind slip fit engagement or attachment point 15 between each motor 12 of the modular motor system 10.

The output shaft 50 is a central polygon-shaped power output shaft 50 which links the rotors of all the motors in the cluster.

The shaft 50 has lobes 50A, 50B and 50C formed therein which are used to position the shaft when connected to the encoder.

There is provided a common fixed relationship between the radial position of the magnets in each rotor 42, as discussed below. The output end of the shaft has lobes 61*a* 61*b* and 61*c* internally which substantially mate in a hole 64 in a rotor hub 60 (FIGS. 2 and 3) of each motor. The power output shaft 50, with external lobes closely dimensionally matching those in the hub 60 is passed through a central hole in the hubs 60.

Inserting the shaft 50 in the central rotor hub holes aligns all of the rotor hubs 60 within the linear cluster in the same manner. This establishes the magnetic synchronization of all the motors in the cluster.

In FIG. 4 there is shown a four motor cluster in accordance herewith. Regardless of the number of motors, each motor is substantially identical and includes a rotor and a stator.

Figure 7:
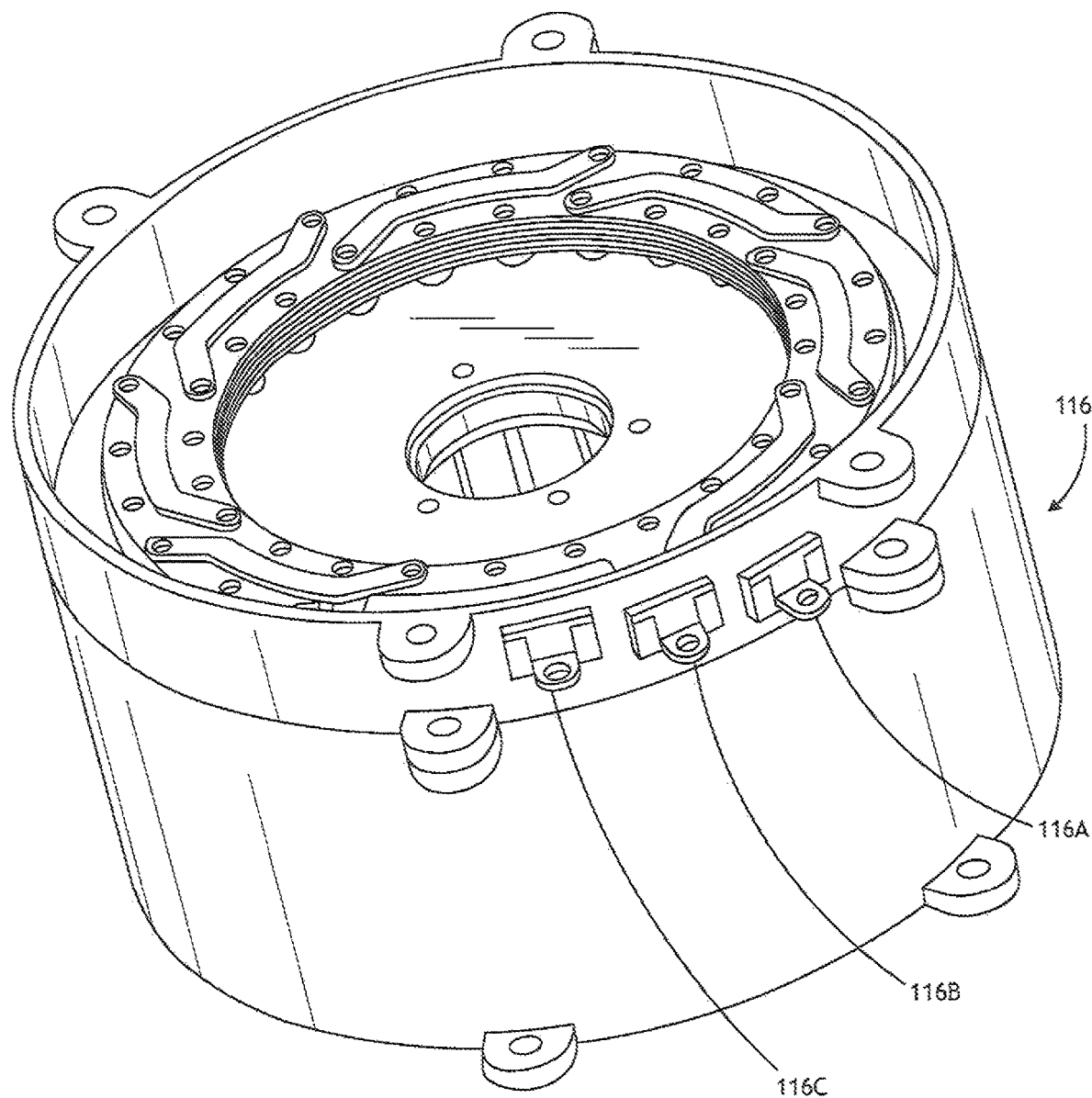
FIG. 7 is a perspective view of an assembled stator used herein.
Figure 8A:
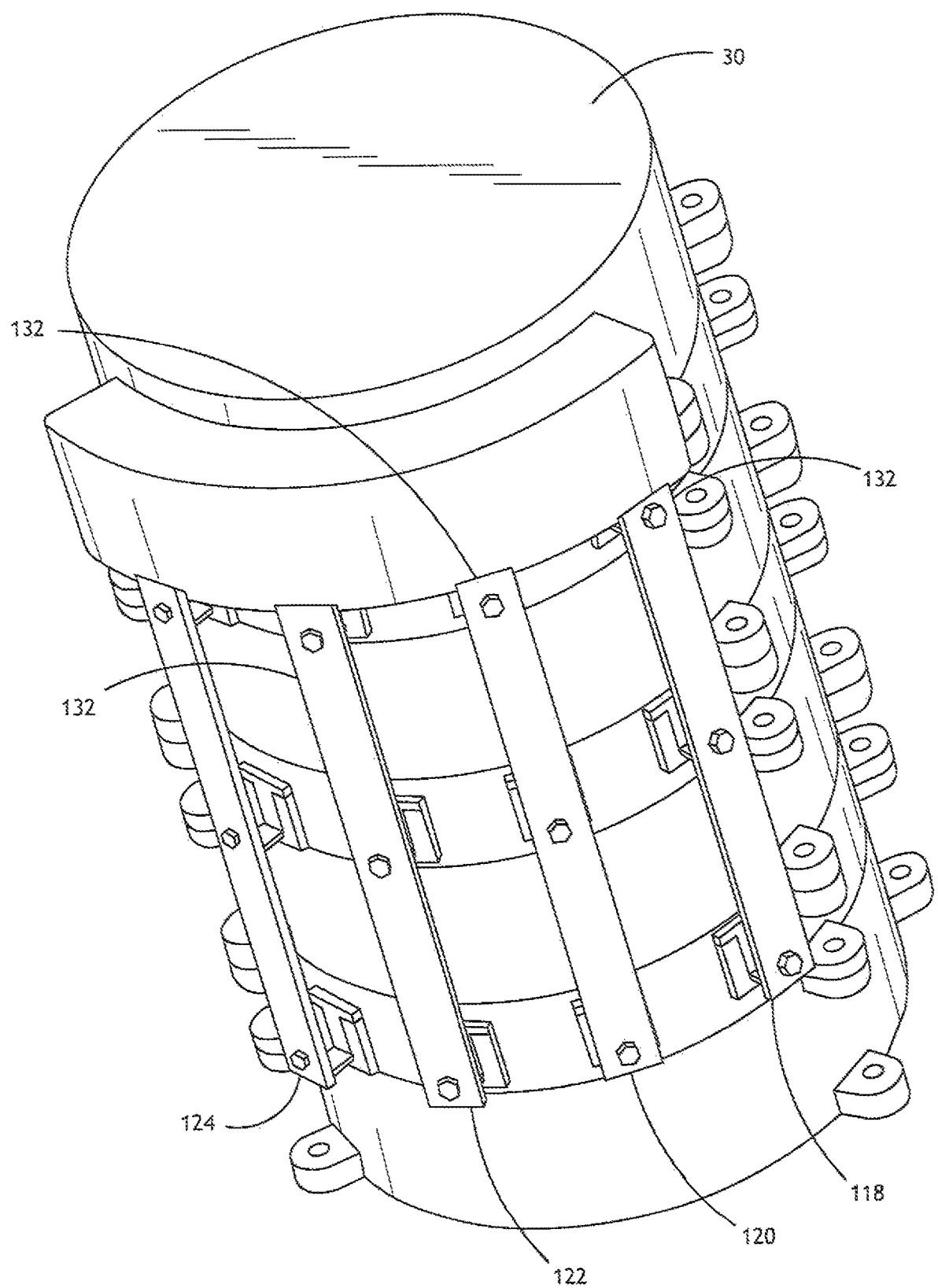
FIG. 8A is a perspective view of an assembled three motor cluster with the bus bars attached.
Figure 8B:
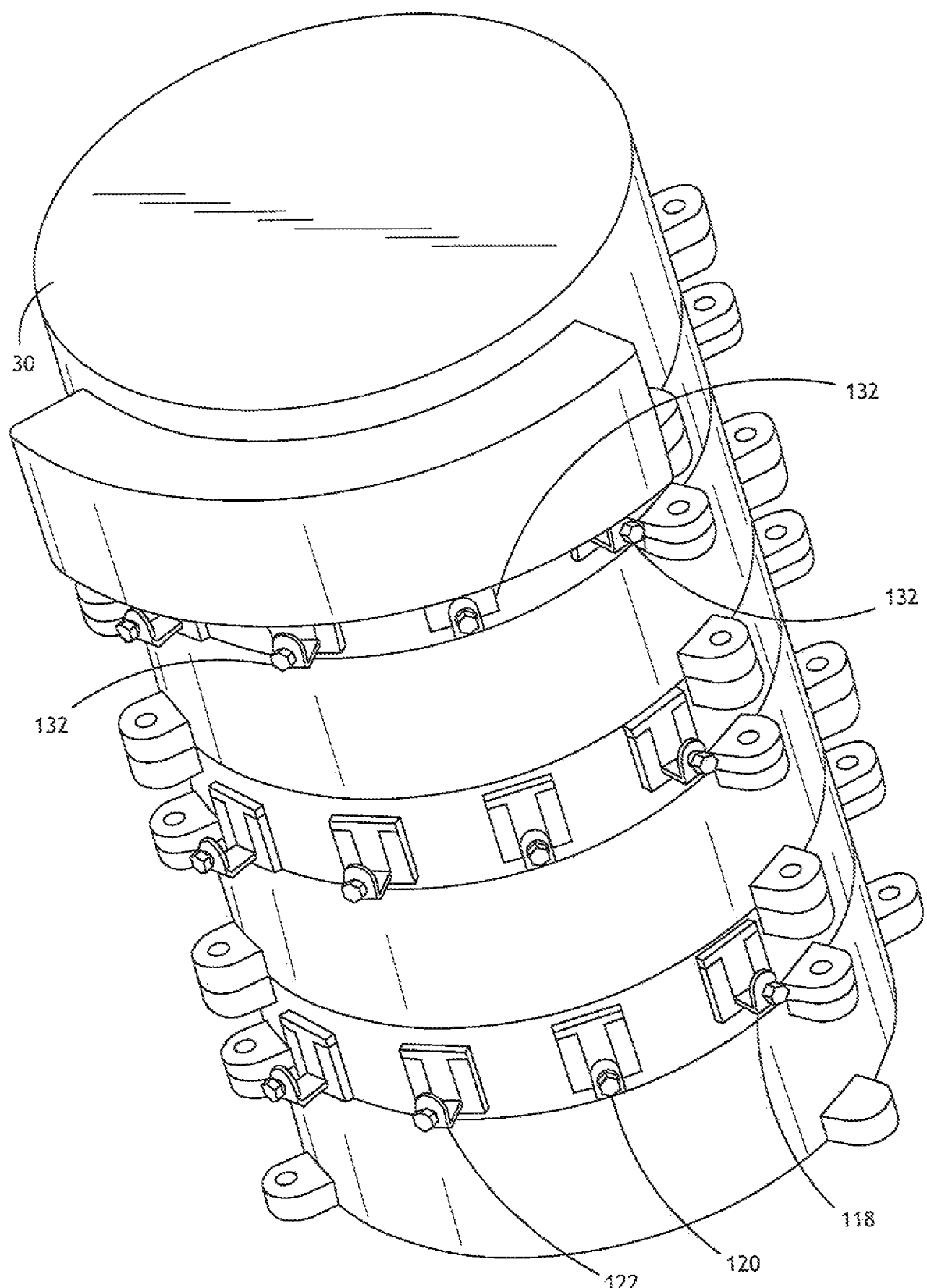
FIG. 8B is a view similar to FIG. 8A without the bus bars.
Figure 9:
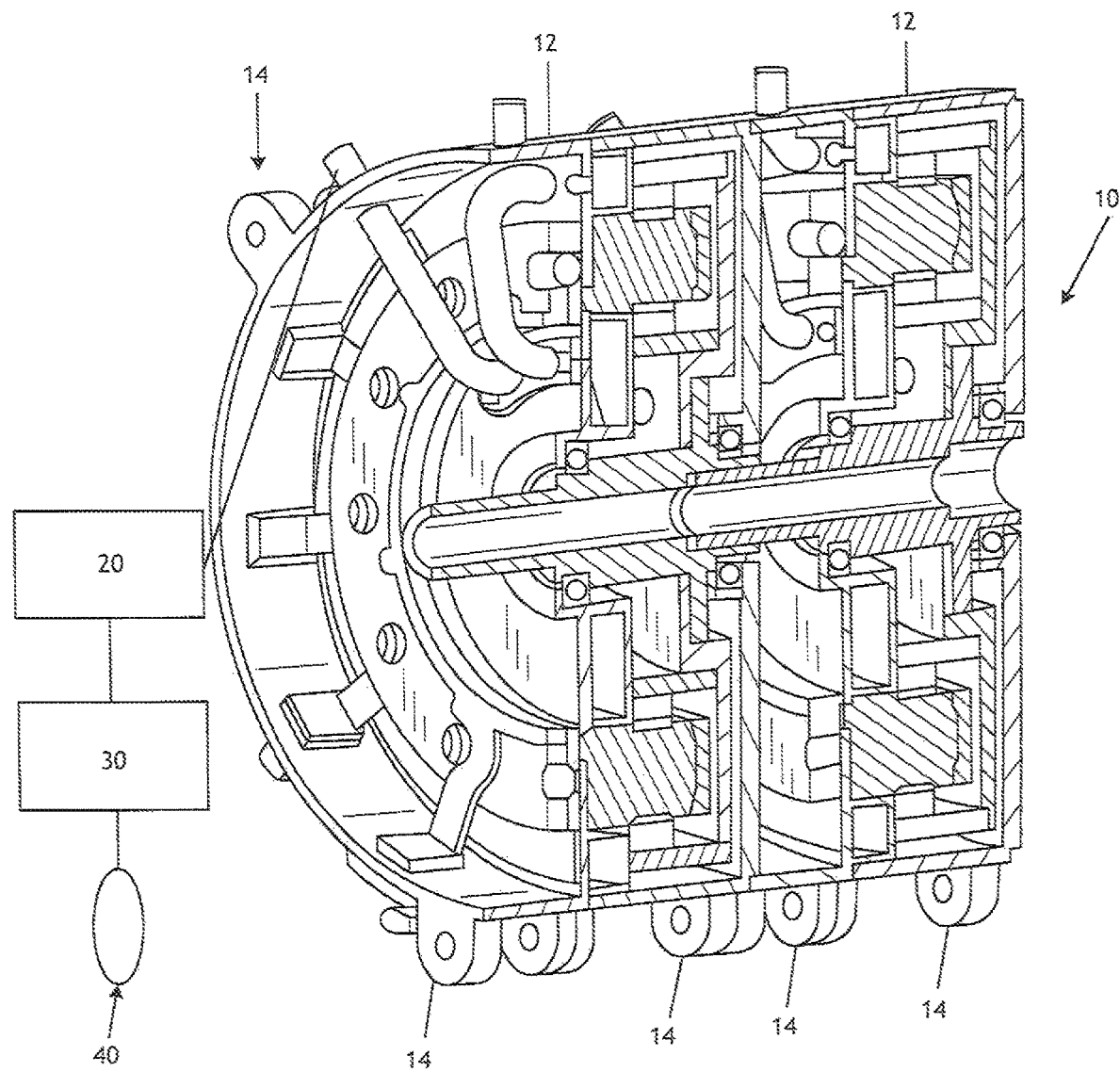
FIG. 9 is a partial, cross-section, perspective of a modular motor cluster assembly in accordance with a second embodiment hereof.
Figure 11:
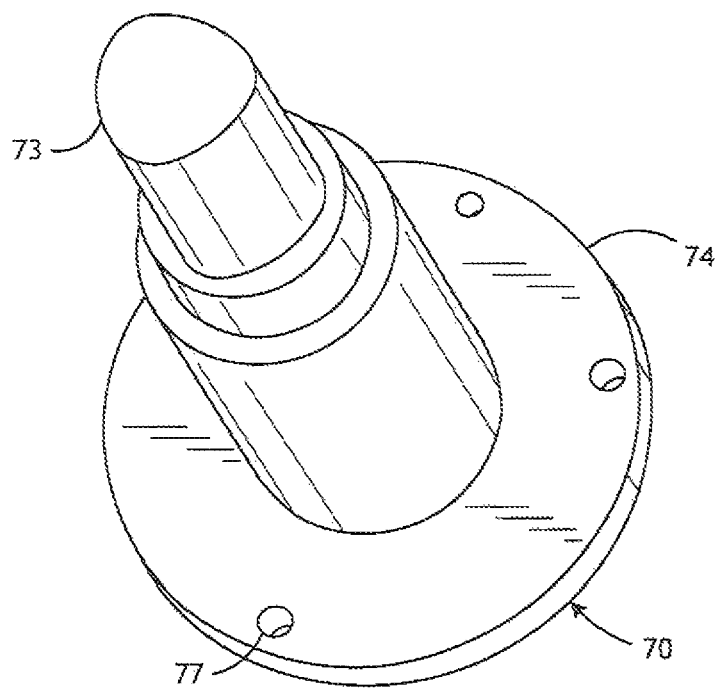
FIG. 11 is a perspective view of the male end of the rotating shaft.
Figure 10:
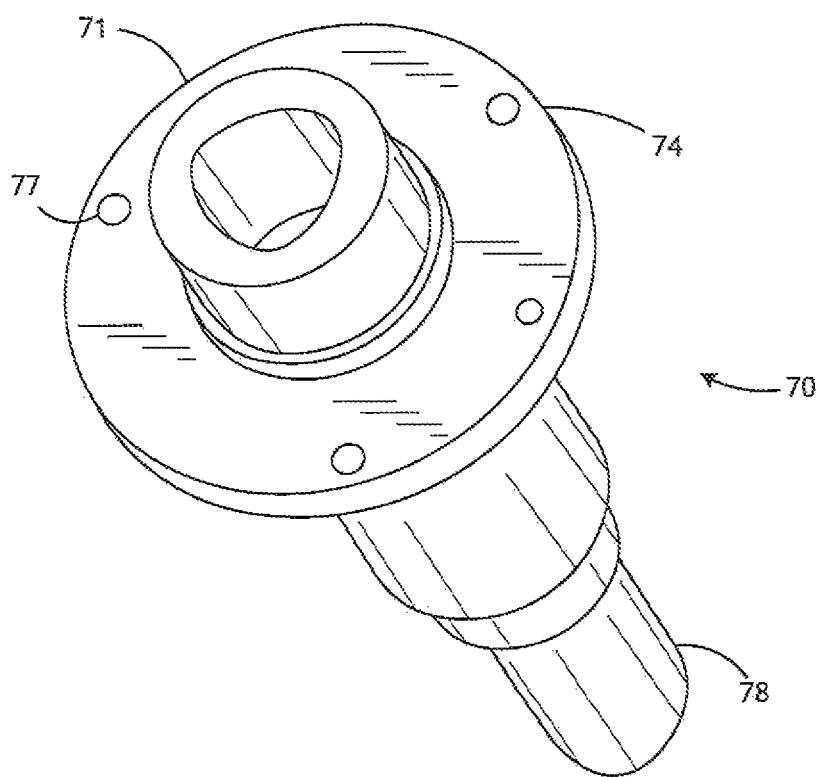
FIG. 10 is a perspective view of the female end of the rotating shaft hub in accordance with the second embodiment.
Figure 12:
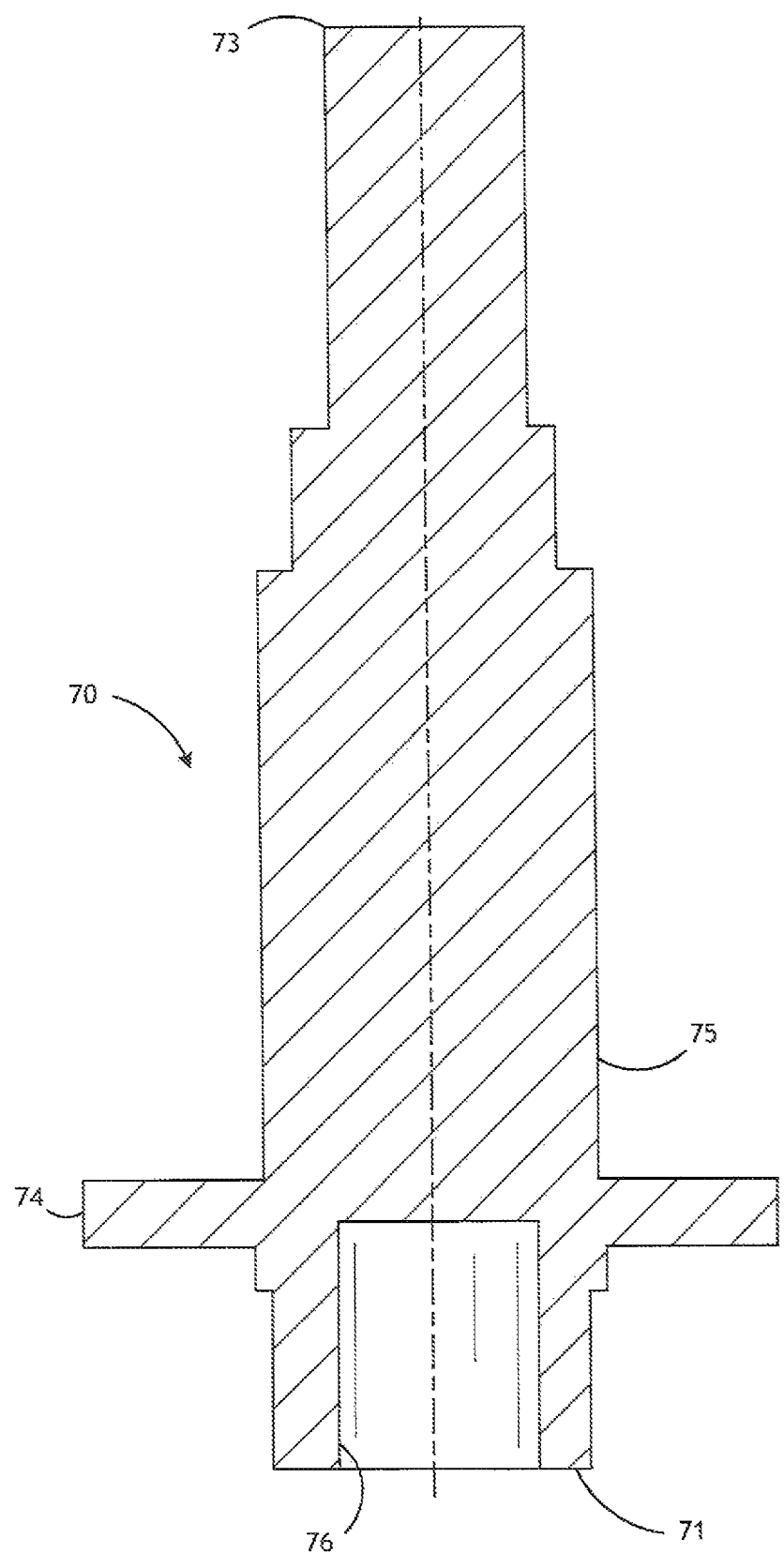
FIG. 12 is a cross-sectional view of the hub and shaft of the embodiment of FIG. 9.

As shown in FIG. 7, the fully assembled single motor and stator is depicted therein having the attachment points for securing the rotor and stator together as well as bus bar connections.

FIG. 6 more clearly depicts the structure of the stator used herein.

FIG. 6 depicts a three-phase stator assembly 113 which includes phases 100, 102 and 104 each having connection wires 106. Each phase is separated by a bus bar phase link electrical insulator 108, 110 and 112. Each stator modular assembly comprises a plurality of individual stators only one of which is shown at 114 which are interconnected. Each module includes coil wire leads 116 A-C which connect to bus bars 118, 120, 122 and which correspond to phases 100, 102 and 104. A common connection bus bar 124 may be included in the assembly.

Motor phase bus bar connection points 132 are disposed exteriorly of the assembly and are used to deliver electrical power to the motor.

Referring now to FIGS. 9-13, and in a second embodiment 200, the motors 12 are coupled or attached to one another and are electrically coupled and synchronized when coupled together.

Here, the male polygon lobe shaped extension 73 is provided on one end of a central hub 70(*a*) and is rotationally aligned with and dimensionally matched to slip fit into or telescope into the polygon shaped cavity 76 at the other end of an adjoining hub. There is a common fixed relationship between the radial position of the rotor magnets and the radial position of the polygon lobes on the central hub 70 as with the first embodiment. When one motor is attached to the other in a linear fashion, the male polygon shaped extension 73 of the hub 70 in the motor below fits into the female polygon cavity 76 of the motor hub 70 above. This establishes the magnetic and electrical synchronization of all the motors in the system. The output shaft 70 may include a first or female end 71 having a polygon shaped cross section for operationally connecting and synchronizing the rotors 80 of each of the motor modules 12 with one resolver or encoder 30 used to determine their collective rotational angle.

The end 71 is preferably a multi-lobe polygon shaped cross-section for establishing a rotational connection. Although the end is shown as having three lobes, the present invention is not to be construed as being so-limited. The rotor output shaft 70 may have a male multi-lobe configuration at a second end 73 opposite the end 71. The multi-lobe polygon power rotor shaft may be provided with a multi-lobe polygon hole extending along a center axis to both externally transmit the combined power of the motors and to coordinate the angular position and rotational motion of the individual motor rotors within the cluster.

The output shaft 70 may include a ring 74 attached to a central hub 75 from which the polygon shaft extends to the first and second ends 71 and 73, respectively. The central hub 75 includes an internal hub hole 76 in the shaft complementary within a close tolerance to an external configuration of the polygon shaped shaft 70 which passes through the hub hole 76 in the central hub hole 76, thereby connecting each rotor 12 and rotationally locking them together within the motor cluster assembly 200.

Figure 13:
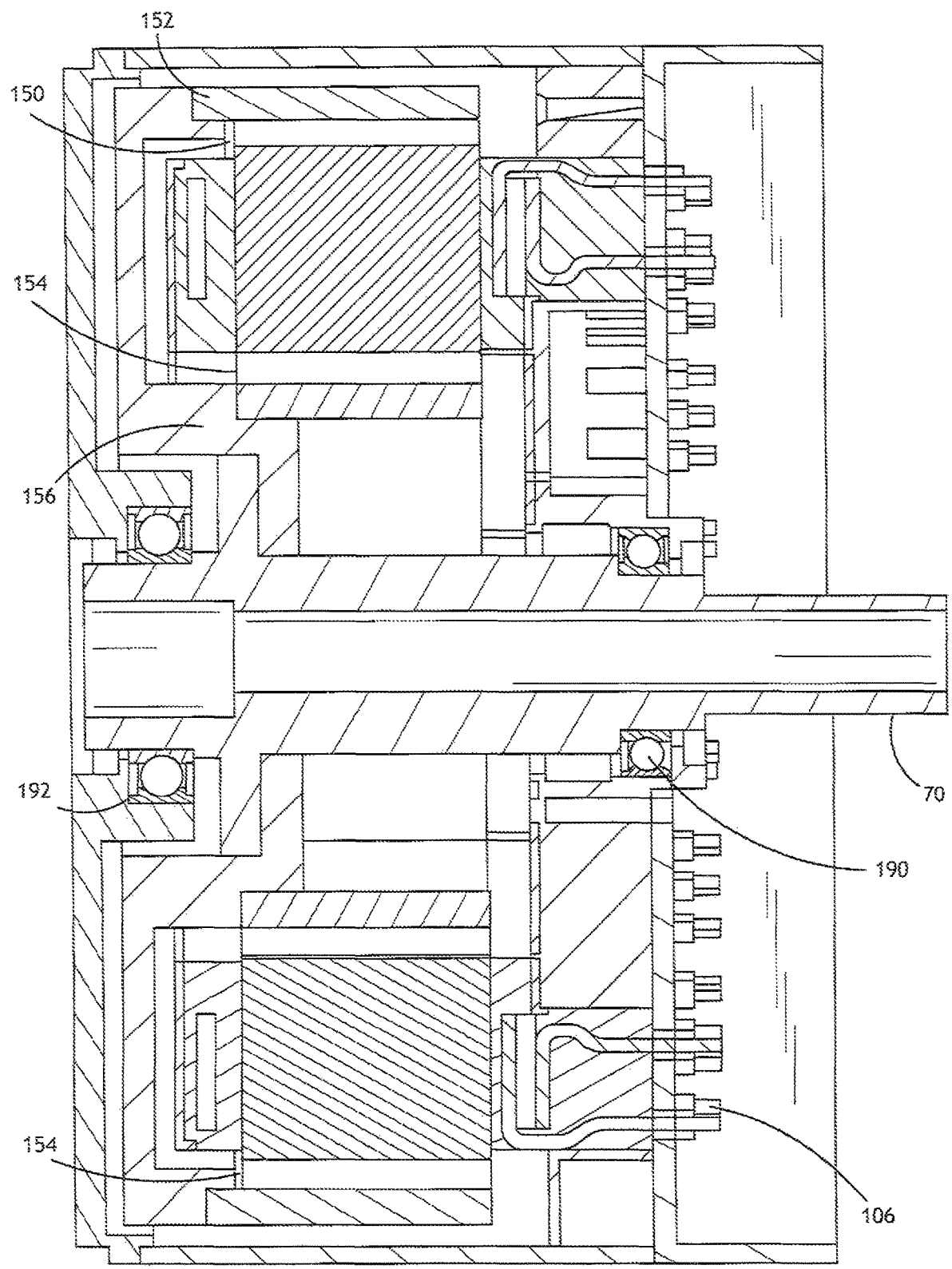
FIG. 13 is a cross-sectional view of the stator used in the second embodiment hereof.

Referring now to FIGS. 13 and 14, there is depicted the cross-sectional view of an assembled rotor and stator as used in this second embodiment of the invention. FIG. 14, which is an exploded view of the rotor, which generally comprises outer ring magnets 150 arrayed in opposite polarity and bounded by a backup iron ring 152. The rotor further includes a second ring of magnets 154 of opposing polarity configured in a circular fashion. The inner magnets are connected to an iron ring 156. The inner magnets telescope into the outer ring magnet array.

Both the inner ring and outer ring magnets are connected to a base 180. The base is dimensioned to seat the magnets thereon. As shown, the base has a central hole 182 which is shaped to enable the ring portion of the shaft 70 to project therethrough and fixedly attach to the base 180 and be oriented with respect to the magnets by attachment holes 182A, 182B and 182C via dowel pins 182D.

As shown, the shaft, proximate the base plate is stepped as at 184, 186. The step 184 has a shoulder 188 which is engaged by upper bearing 190. A lower bearing 192 is seated onto the terminus of the shaft 186. The assembly can be threaded together to combine and form the combined rotor and stator to define a motor.

Although not shown in the drawing, in operation, a source of power, such as a battery, generator or the like is connected to each of the stators such that a single source of power is used for the cluster.

Having thus described the invention, what is claimed is:

1. A synchronized dual radial gap motor cluster assembly comprising:
   (a) a motor having:
   (b) a polyonally shaped shaft having at least a pair of lobes;
   (c) at least a pair of spaced apart interconnected motors, each motor including a motor and a stator, a magnet mounted to the rotor, the magnets being magnetically aligned, each stator being aligned with the at least other stator, and
   (d) an electrical power contact for each of the phases of the motor and a common ground contact, each point of contact being angularly offset within each motor and protrudes externally from the motor housing and
   wherein each rotor is rotationally mounted to the shaft.

2. The motor cluster assembly of claim 1 further comprising at least a pair of magnet rotor rings centrally oriented around the shaft, and a base plate connecting the magnet rotor rings.

3. The cluster motor assembly of claim 2, wherein: the rotor power output shaft has a polygon shape at each end to operationally connect and synchronize the magnetic orientation of the rotors of each of the motor modules with one another.

4. The cluster motor assembly of claim 1, which further comprises: one resolver for determining the collective rotational angle and one controller to control the motion of the cluster.

5. The cluster motor assembly of claim 1 wherein the rotor shaft has a multi-lobe polygonal hole extending along its center axis.

6. The cluster motor assembly of claim 1 wherein: the rotor output shaft has a male multi-lobe configuration at one end and a female multi-lobe configuration at the other end to allow the at least the pair of motors to couple or attach within one another and to be operationally attached and magnetically synchronized when coupled together.

7. The cluster motor assembly of claim 1 wherein: the points of contact for each of the motors within the cluster are axially in-line with one another.

8. The cluster motor assembly of claim 1 wherein: the attachment points of each motor are configured to be complementary when assembled and mechanically connected in-line with one another, in-series, end-to-end, in a linear configuration.

* * * * *